United States Patent [19]
Kenyon

[11] Patent Number: 4,869,448
[45] Date of Patent: Sep. 26, 1989

[54] HEAD RESTRAINT FOR VEHICLES

[76] Inventor: William E. Kenyon, 6035 W. Mary Jane La., Glendale, Ariz. 85306

[21] Appl. No.: 273,694

[22] Filed: Nov. 21, 1988

Related U.S. Application Data

[63] Continuation of Ser. No. 64,759, Jun. 22, 1987, abandoned.

[51] Int. Cl.⁴ .................................................. A47C 7/36
[52] U.S. Cl. ................................. 248/118; 248/200.1; 297/406
[58] Field of Search ..................... 248/118, 200.1, 238, 248/225.31; 297/406, 407, 408, 410, 391, 395; 296/77.1; 280/748, 751

[56] References Cited

U.S. PATENT DOCUMENTS

| | | | |
|---|---|---|---|
| 1,716,708 | 6/1929 | Shipley et al. | 248/200.1 X |
| 1,841,954 | 1/1932 | Jellineck | 280/748 |
| 3,090,600 | 5/1963 | Smith | 248/200.1 X |
| 3,222,084 | 12/1965 | Hesen | 280/748 |
| 3,253,859 | 5/1966 | Merriman et al. | 297/407 X |
| 3,393,938 | 7/1968 | Meyer et al. | 248/118 X |
| 3,961,822 | 6/1976 | Daniel | 248/200.1 X |
| 4,607,886 | 8/1986 | Mazhae | 297/395 X |

FOREIGN PATENT DOCUMENTS

| | | | |
|---|---|---|---|
| 42022 | 10/1965 | German Democratic Rep. | 248/118 |
| 182999 | 7/1922 | United Kingdom | 248/200.1 |

Primary Examiner—Ramon S. Britts
Assistant Examiner—Karen J. Chotkowski
Attorney, Agent, or Firm—Charles E. Cates

[57] ABSTRACT

A head restraint system for vehicles including an extensible support provided with energy absorbing devices which limit the rearward angular displacement of the occupant's head. The support is secured to each side of the interior of a vehicle so that the support is positioned horizontal to the top of a seat back and substantially in the same vertical plane as the seat back.

10 Claims, 1 Drawing Sheet

HEAD RESTRAINT FOR VEHICLES

This is a continuation of application Ser. No. 07/064,759, filed June 22, 1987 and now abandoned.

FIELD OF THE INVENTION

This invention relates to head restraints for vehicles such as trucks and passenger cars.

BACKGROUND OF THE INVENTION

The utility and need for head restraints in vehicles is well established. Such head restraints are devices to limit the rearward angular displacement of the vehicle occupant's head relative to his torso line. In fact, the Federal Department of Transportation (DOT) has a standard for such restraints as applied to passenger cars—see 49 CFR Ch.V, Section 571.202. The purpose of such head restraints is to reduce the frequency and severity of neck injury in rear-end and other collisions. Drivers and occupants of later model passenger cars are certainly familiar with such head restraints since DOT regulations do require that head restraints be installed in all passenger cars. However, such DOT regulations do not apply to trucks, and to passenger cars built prior to the effective date of the regulation.

With respect to so-called factory installed head restraints, such restraints are an integral part of the seat assembly and vertically adjustable to conform to occupant's of varying size. To attempt to incorporate a head restraint in a seat which is already installed in a vehicle would, at the very best, be both extremely difficult and expensive. Thus, there exists a need for a head restraint system which can be easily installed in vehicles without modification to the existing seat structure.

OBJECTS OF THE INVENTION

The object of the present invention is to provide a head restraint system for vehicles.

Another object of the present invention is to provide a head restraint system which is readily adaptable to be installed in vehicles of varying types and which can be adjusted to meet the occupant's requirements.

A further object of this invention is to provide a head restraint system which provides the benefits of so-called factory installed systems but which can be installed without making any modifications to the existing vehicle.

These and other objects of the invention will become apparent as the specification proceeds.

SUMMARY OF THE INVENTION

According to the teachings of the invention of this application a head restraint system is provided which is easily mounted in the interior of a vehicle such as trucks, which is readily adjustable to vehicles of varying types and width and which is easily positioned to properly limit the rearward displacement of a vehicle's occupant in the event of a collision. Moreover, the system will accommodate both bench type and individual seats and a varying number of occupants in the vehicle.

The foregoing is accomplished by mounting an extensible support member above and substantially parallel to the top of the seat in a vehicle, the support member being provided with one or more energy absorbing devices which limit the rearward angular displacement of the occupant's head. The support member is secured to each side of the interior of the vehicle, preferably to the door pillar immediately to the rear of the doors of a two-door vehicle.

DESCRIPTION OF THE DRAWINGS

Turning now to the drawings in which the presently preferred embodiments of the invention are illustrated and from which further features and advantages Will appear.

DETAILED DESCRIPTION OF THE EMBODIMENTS

Figure 1:
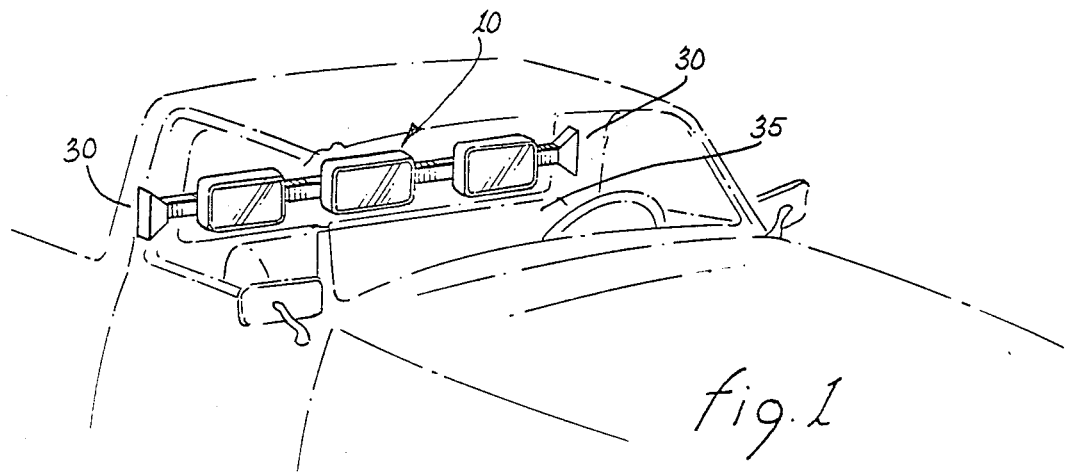
FIG. 1 is a perspective view showing the head restraint system mounted in the cab of a truck.
Figure 2:
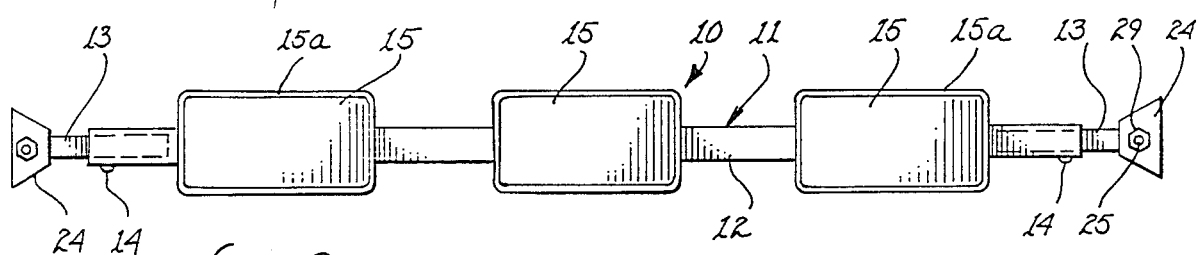
FIG. 2 is a front elevation view of the head restraint system shown in FIG. 1.
Figure 3:
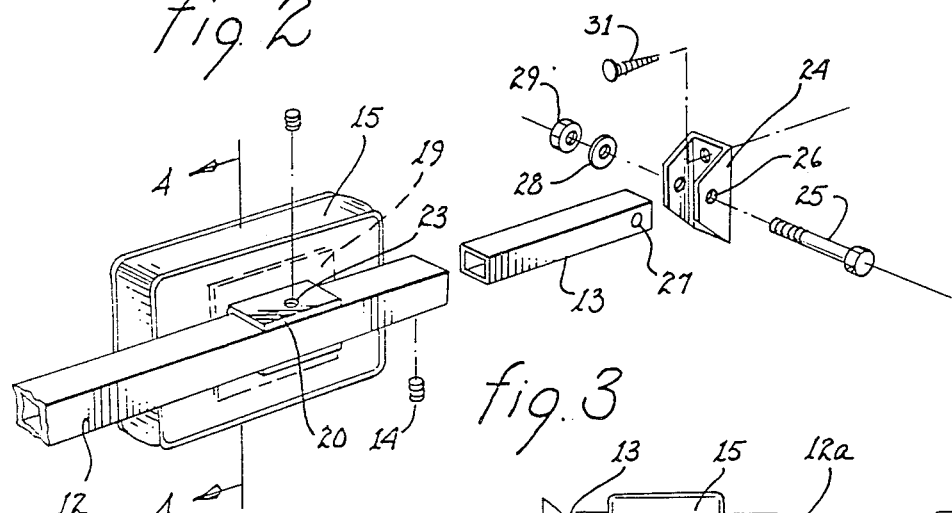
FIG. 3 is a perspective view of a portion of the head restraint system showing the mounting of a head restraint to the extensible support member and means for securing the system in a vehicle.
Figure 4:
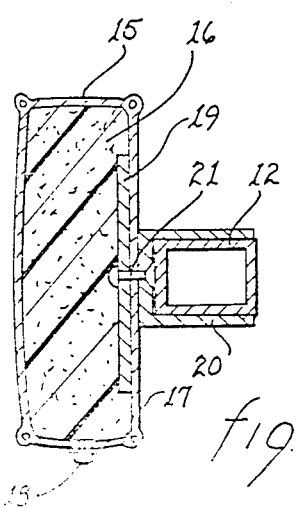
FIG. 4 is a sectional view of FIG. 3 taken along the line 4—4.

The head restraint system shown generally at 10 in FIGS. 1 and 2 includes a support member having an angular cross section (as best seen in FIGS. 3 and 4), preferably the three-piece support member shown generally at 11 which includes a center support 12 and side supports 13. As shown best in FIG. 3, side supports 13 extend from center support 12 telescope into the center support 12 and are locked into position by means of set screws 14. Thus, the length of support member 11 can be easily adjusted to accommodate vehicles of varying interior dimensions. The support members as shown are formed of generally rectangular rigid tubing with the cross-sectional dimensions of supports 13 being less than center support 12 so that the side supports 13 telescope into the center support 12. One or more energy absorbing head restraints 15 are slideably mounted to support 11 and, as shown in FIG. 2, specifically to center support 12. As shown best in FIGS. 3 and 4, such head restraints are generally rectangular shaped and are filled with an energy absorbing material 16 such as polyurethane foam or foam rubber and covered with a suitable fabric 17 such as vinyl or velour. A zipper 18 or other closing means is provided for at the bottom side of the head restraint to facilitate access to the interior thereof. Preferably, the lateral width of such restraints will be not less than about 10 inches for use with bench-type seats and not less than about 6.75 inches for use with individual seats.

The head restraint is mounted to the center support 12 in the following manner. Positioned in the interior of the head restraint 15 is a mounting plate 19 made of steel, aluminum, or other rigid material. Mounting plate 19 is fastened to a generally U-shaped bracket 20 by means of rivet 21 or other suitable fastening device. As shown in FIGS. 3 and 4 bracket 20 is slideably mounted on center support 12 and can be locked into any appropriate position on support 12 by means of set screw 22 which is received by threaded hole 23 in bracket 20 and engages support 12. Thus the head restraint 15 is prevented from rotating about the support 12 if struck by an occupant's head.

Means are provided for mounting the head restraint system in the interior of a vehicle. Referring to FIG. 3 there is shown mounting bracket 24 which is adapted to receive the end of side support 13. Support 13 is pivotally secured to U-shaped bracket 24 by means of threaded bolt 25 which is inserted through holes 26 of bracket 24 and then through the end of support 13 via hole 27. The attachment is completed by means of lock washer 28 and nut 29. Bracket 24 is secured to the vehicle door pillar 30 by means of sheet metal screw 31 or other suitable fastener.

Figure 6:
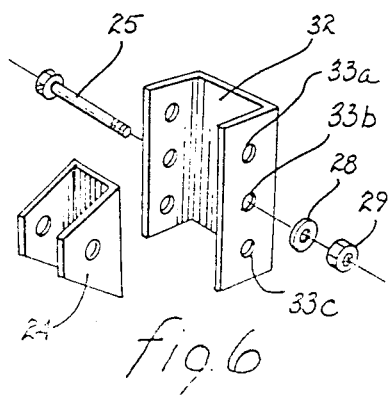
FIG. 6 is a perspective view of a modified means for mounting the head restraint system in a vehicle.

FIG. 6 shows a modified mounting bracket 32 provided with a series of holes 33a, 33b and 33c arranged vertically on the bracket. Bracket 32 is secured to vehicle door pillar 30 in the same manner as bracket 24. The use of bracket 32 with its multiple holes provides for somewhat greater flexibility in mounting the head restraint system in a vehicle in that after the bracket has been secured to the door pillar, the head restraint system may be moved in a vertical plane to better meet the occupants' requirements.

Figure 5:
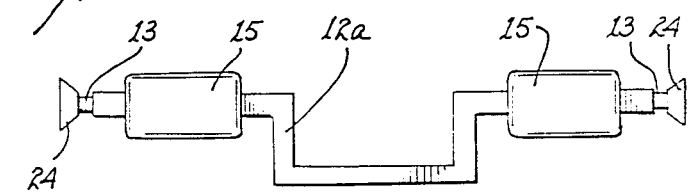
FIG. 5 is a front elevation view of a modification of the head restraint system.

FIG. 5 shows a modification of the head restraint system in that the center support 12a is generally U-shaped rather than straight as shown in FIGS. 1-3. Such a modification is desirable in vehicles with two individual seats as opposed to a bench seat and where a head restraint is unnecessary in the center of the vehicle. Moreover, by making the center support 12a U-shaped, the driver's visibility to the rear of the vehicle through the rear view mirror is improved.

Installation of the head restraint system in a vehicle is easily accomplished. A system such as shown in FIG. 2 is assembled including head restraints 15 and brackets 24. The assembled system is then placed in the vehicle immediately above the top of bench seat back 35 as shown in FIG. 1 and substantially in the same vertical plane as the seat back. Proper vertical positioning of the system results when the top edge 15a of head restraints 15 is usually about 27 inches above the seat cushion. After proper positioning has been achieved, the position of brackets 24 or 32 is noted on the side of each door pillar 30. The head restraint system is removed from the vehicle and holes are drilled into the structural member of pillar 30. Thereafter, each of brackets 24 or 32 are attached to door pillars 30 by means of sheet metal screws 31. After the brackets have been secured to the door pillars, the three piece support member 11 is mounted to the brackets by means of bolts 25 and lock washer and nut 28 and 29 respectively. Thereafter, set screws 14 are tightened and horizontal adjustment of head restraints 15 can then be made. The head restraints 15 are positioned on support 12 so that they are centered with the midline of an occupant when seated in the vehicle. Following proper positioning, set screw 22 is tightened. Installation is basically the same if the modified head restraint system of FIG. 5 is used or if the modified mounting bracket showing in FIG. 6 is used.

I claim:

1. A head restraint system for vehicles comprising a rigid, elongate support member having an angular cross section and a plurality of sides; at least two energy absorbing head restraints positioned on said support member by means of a bracket having a base affixed to said head restraint and at least two arms engaging at least two of said sides of said support member whereby said head restraint is prevented from rotating around said support member; and means for non-rotatably mounting said support member to opposed door pillars in the interior of a vehicle and substantially parallel to the top of a seat back in said vehicle.

2. The head restraint system of claim 1 wherein said support has a downwardly U-shaped segment at its middle and wherein said restraints are positioned on said support member a distance outside the parallel arms of said U-shaped segment.

3. The head restraint system if claim 1 wherein said support member comprises telescoping sections, whereby the length of said support member may be varied to accommodate vehicles of differing interior dimensions.

4. The head restraint system of claim 1 wherein said vehicle is a pick-up truck.

5. The head restraint system of claim 1 wherein said vehicle is a van.

6. The head restraint system of claim 1 wherein said support member is substantially in the same vertical plane as a seat back of the vehicle.

7. The head restraint system of claim 2 wherein said support member is substantially in the same vertical plane as a seat back of the vehicle.

8. The head restraint system of claim 3 wherein said support member is substantially in the same vertical plane as a seat back of the vehicle.

9. The head restraint system of claim 4 wherein said support member is substantially in the same vertical plane as a seat back of the vehicle.

10. The head restraint system of claim 5 wherein said support member is substantially in the same vertical plane as a seat back of the vehicle.

* * * * *